(12) United States Patent  
Sornay et al.

(10) Patent No.: US 7,992,811 B2  
(45) Date of Patent: *Aug. 9, 2011

(54) PROCESS FOR THE MANUFACTURE OF A PARTICULATE MATERIAL AND PARTICULATE MATERIAL OBTAINED BY THIS PROCESS

(75) Inventors: Philippe Sornay, Manosque (FR); Eric Bertrand, Aix-en-Provence (FR)

(73) Assignee: Commissariat a l'Energie Atomique, Paris (FR)

( * ) Notice: Subject to any disclaimer, the term of this patent is extended or adjusted under 35 U.S.C. 154(b) by 250 days.

This patent is subject to a terminal disclaimer.

(21) Appl. No.: 12/086,763

(22) PCT Filed: Dec. 19, 2006

(86) PCT No.: PCT/FR2006/002785  
§ 371 (c)(1),  
(2), (4) Date: Feb. 18, 2009

(87) PCT Pub. No.: WO2007/071843  
PCT Pub. Date: Jun. 28, 2007

(65) Prior Publication Data  
US 2010/0032504 A1 Feb. 11, 2010

(30) Foreign Application Priority Data  
Dec. 19, 2005 (FR) ...................................... 05 12892

(51) Int. Cl.  
*B02C 19/00* (2006.01)

(52) U.S. Cl. .......................................... 241/22; 241/175
(58) Field of Classification Search .................. 241/175, 241/30, 22, 21; 264/0.5; 252/638; 376/409  
See application file for complete search history.

(56) References Cited

U.S. PATENT DOCUMENTS

| 6,235,223 B1 | 5/2001 | Doerr et al. |
| 6,783,706 B1 * | 8/2004 | Vandergheynst et al. ...... 264/0.5 |
| 2007/0284766 A1 * | 12/2007 | Feugier et al. ................. 264/0.5 |

FOREIGN PATENT DOCUMENTS

| DE | 31 44 684 | 4/1983 |
| EP | 0 249 549 | 12/1987 |
| FR | 1 407 497 | 7/1965 |
| FR | 2 786 479 | 6/2000 |
| FR | 2 861 888 | 5/2005 |

* cited by examiner

*Primary Examiner* — Mark Rosenbaum  
(74) *Attorney, Agent, or Firm* — Harness, Dickey & Pierce, P.L.C.

(57) ABSTRACT

In one embodiment of the present invention, a process for manufacturing at least one particulate material is disclosed, the process including the following consecutive steps of: a) introducing into a vibrating grinder at least two powders each comprising $UO_2$, provided by two different synthesis routes and of close specific surface area; b) shaking the powders into the grinder so as to form a particulate material, the grinding intensity being sufficient to break up the agglomerates and the aggregates in the powders without at the same time breaking up the crystallites in the powders, and the grinding energy being such that all of the agglomerates and aggregates are destroyed. One embodiment of the present invention also concerns a particulate material obtained by this process.

21 Claims, 6 Drawing Sheets

PROCESS FOR THE MANUFACTURE OF A PARTICULATE MATERIAL AND PARTICULATE MATERIAL OBTAINED BY THIS PROCESS

FIELD OF THE INVENTION

The present invention relates to a process for the manufacture of at least one particulate material containing at least one uranium dioxide $UO_2$, and specifically a process for the manufacture of a particulate material suitable for compression and sintering, having compressibility and sinterability properties giving it many advantages when it is submitted to a process of compression followed by a process of sintering. The invention also relates to the particulate material obtained by this process.

More specifically, the invention applies to the use of the particulate material for manufacturing nuclear fuel pellets, generally by compaction then sintering of the particulate material.

DESCRIPTION OF THE RELATED ART

Oxide powders, in particular uranium oxide powders (such as uranium dioxide) used in the manufacture of fuel elements for nuclear reactors, generally exist in the form of crystallites with an average diameter ranging from 0.08 to 0.5 µm. These crystallites are more or less strongly bound together to form aggregates, which in turn are more or less strongly bound together to form agglomerates. Generally, the average diameter of the aggregates ranges from a few micrometers to a few tens of micrometers, for example from 2 to 60 µm, and the average diameter of the agglomerates ranges from a few micrometers to a few hundreds of micrometers, for example from 2 to 700 µm.

In order to form a nuclear fuel into a pellet or any other shape from such oxide powders, several manufacturing steps are generally required, namely the following consecutive steps:

i) An oxide powder is introduced into a mould or pressing die. Generally, the powder has to fill the entire volume which is accessible to it within the mould, thus making it possible afterwards to obtain a compact and sound material (free of blemishes and/or crack(s) that may or may not show up on the surface) with minimum porosity. This ability of a powder to completely fill a mould is referred to as flowability. It varies widely from one powder to another. In order to obtain sufficient flowability, it may be required to pre-process the powder (for example by means of a granulating process, such as an atomization or mechanical granulation process), ii) A shaping stress is then applied to the powder contained in the mould, for example by cold uniaxial pressing, in order to compact the powder. For nuclear oxide powders, this stress generally ranges from 200 to 600 MPa. At the end of this compaction step, a body of compacted material, or a so-called green compact, made of nuclear fuel, is obtained. Generally, this body has the form of a pellet, but any other shape is possible. The compact has enough cohesion to be handled during the later stages of nuclear fuel manufacturing, in the form of pellets or tablets or other shapes. The compressibility of the powder, which can be measured, is a curve representing the change in density (in $g/cm^3$) of the dense material versus the applied stress (in MPa). Compressibility is thus a relative concept that depends on the operating conditions, in particular if lubricant is added to the powder or if the mould is lubricated with a lubricant spray, for example before each compaction. Two powders may be compared in terms of their compressibility, all things being equal. In this respect, the NF EN 725-10 standard can be referred to.

iii) Then, the density and cohesion of the above obtained green compact is increased by applying at least one sintering cycle in which the pellet (or any other shape) generally undergoes a change in temperature and/or pressure with time, as known to those skilled in the art. Of course, other parameters may influence the sintering cycle, for instance the atmosphere, the presence of impurities, and the like. As a result of this sintering cycle, a sintered body, made of a dense material, is obtained and has a larger density than that of the green compact. For oxides intended to be used in the nuclear field, the sintering cycle is generally as follows: first the temperature is raised to the sintering temperature, generally around 1600° C., and this sintering temperature is then maintained, generally for a few hours, and more often four hours. The sinterability of a powder represents the change in density of the sintered body as a function of the green compact's density. Therefore, sinterability is a relative concept which depends on the operating conditions. Two powders may be compared in terms of their sinterability, all things being equal. In this respect, the B42-011 standard can be referred to.

iv) Finally, this sintered body still needs to be provided with its appropriate dimensions so that it may be used as a pellet (or any other shape) of nuclear fuel. To this end, it is generally necessary to machine the sintered body to a standard size, which generally consists in removing some material to provide the pellet (or any other shape) of nuclear fuel with the appropriate shape and size to be used in a nuclear reactor. Deviations from the standard size are generally caused, for a pellet, which is the most common form used, by insufficient control of the average diameter with respect to the specified range and by a deviation from cylindricality due to the stress gradient generated in the green compact during uniaxial pressing.

From patent application FR 2,861,888 a process for the manufacture of nuclear fuel pellets is known, which consists in preparing a particulate material having given properties from a uranium dioxide powder. It is this particulate material which is then subjected to the above-mentioned manufacturing steps (i) to (iii). The technical problem to be solved by the invention disclosed in this previous patent application was to obtain a particulate material having the properties of flowability and bulk density required for its introduction into the mould in step (i), while avoiding the numerous and complex operations that had to be carried out for that purpose, as previously known in the art. To this end, this patent application proposes to introduce the powder of uranium dioxide intended to enter the composition of the nuclear fuel into a vessel containing movable compression members, and this vessel is then shaken in order to form the desired particulate material. Only one uranium dioxide $UO_2$ powder (main component of the nuclear fuel) is used, which uranium dioxide $UO_2$ powder is derived from a process for the conversion of uranium hexafluoride. One or more additives, such as other oxides or pore forming substances are sometimes added to the powder.

Patent application FR 2,861,888 mainly relates to a uranium dioxide powder $UO_2$ produced through a process of the "dry route" type. These "dry route" processes are generally those in which the powder results from a conversion of the uranium hexafluoride ($UF_6$) into $UO_2$ by solid—gas reactions. "Wet route" processes, on the other hand, are generally those in which the powder results from a conversion of $UF_6$ or uranium nitrate through liquid—liquid and liquid—solid reactions. For criticality and waste treatment management reasons, the industry generally prefers to manufacture the powders using a "dry route" process.

The object of this patent application was only to solve the problems relating to the compaction of a particulate material provided by a single uranium dioxide powder, mainly obtained by means of a "dry route" process.

The problems usually encountered during the green compact sintering step (iii) are in no way addressed in this patent application. However, the sinterability of a powder is problematic for uranium dioxide powders, in particular for those resulting from <<wet route>> processes, in particular because of their sinterability characteristics, which are inferior to those of powders produced by <<dry route>> processes, although their characteristics of density and flowability are superior.

This is because, in addition to the fact that this sinterability depends on the size and shape of the powder crystallites, the degree of aggregation and/or agglomeration of the crystallites also has a strong influence. As a consequence, after sintering, the densities of the sintered bodies whose corresponding green compact had the same density before sintering but were prepared from two powders containing crystallites of the same size and same shape, can vary widely if the states of agglomeration and aggregation among these powders are different, for example because they were obtained through two different synthesis routes. This may be the case when a process is of the wet route type and the other process is of the dry route type; or when both processes, although being of the same "wet" or "dry" route type, are nevertheless different in their operating procedure.

Lastly, it should be noted that, in general, the sinterability of powders is strongly related to operating parameters such as the value of the shaping stress applied to the particulate material during the compaction step.

In practice, this variability in the sinterabilities of the powders has many disadvantages, namely:

a) the non-reproducibility of the dimensions of the sintered body which makes it necessary to re-grind it in order to provide it with its final dimensional characteristics, thus strongly lengthening and increasing the complexity of the process for manufacturing a nuclear fuel pellet (or any other shape) ready for use. On the other hand, this re-grinding operation implies the loss of part of the useful fuel material, which has just been manufactured using a difficult method. Finally, this operation is hazardous since it produces extremely fine actinide oxide dusts, which can present health risks due to their toxicity (such as a $PuO_2$ powder) and radioactivity;

b) the disparity in sintering behaviours between powders having widely variable states of agglomeration and aggregation. This disparity requires continual adjustment of the shaping and/or sintering parameters.

Therefore, there exists a strong need for new manufacturing processes of nuclear fuel, in the form of pellets or tablets or other shapes, to solve the problems and remedy the disadvantages of prior art techniques.

Accordingly, one of the objects of the present invention is to provide a process for the manufacture of at least one particulate material from two powders each containing uranium dioxide $UO_2$, so that it has the same sinterability whatever the state of agglomeration or aggregation exhibited by the starting powders, and also has a sinterability which has a very small dependence on the density of the green compacts (that is, on the shaping stress applied to the particulate material originating from the powders).

DESCRIPTION OF THE INVENTION

The invention relates to a process for the manufacture of at least one particulate material, the process comprising the consecutive steps of:

a) introducing at least two powders each comprising uranium dioxide $UO_2$ into a vibrating grinder, wherein at least two powders are provided by two different synthesis routes and each powder has a specific surface area close to that of any other uranium-dioxide containing powder introduced into the grinder;

b) shaking the powders by means of the vibrating grinder so as to form a particulate material, the grinding intensity being sufficient to break up the agglomerates and the aggregates in the powders without at the same time breaking up the crystallites in the powders, and the grinding energy provided to the powders being such that substantially all of the agglomerates and aggregates are destroyed.

According to the present invention, by "particulate material" is meant a material containing the crystallites of the powders having a reduced degree of agglomeration or aggregation compared to that of each of the original powders, whereas the size of the crystallites has practically not changed.

Practically, this degree of agglomeration or aggregation can be equal to zero, so that the particulate material is only made of crystallites.

The invention has thus also for object a particulate material comprising uranium dioxide $UO_2$, characterised in that the dioxide is in the form of non-agglomerated and/or non-aggregated crystallites.

Further according to the invention, by "similar specific surface area" is meant that a specific surface area does not differ from any other specific surface area by more than 10 $m^2/g$, preferably by 2 to 5 $m^2/g$, and more preferably by 2 to 3 $m^2/g$.

The measurement of the grinding energy applied to the powders is very delicate, but is directly correlated, for a given grinding intensity, to grinding duration.

Also, measuring the agglomerates is generally carried out by dry sieving or laser granulometry, provided this analysis does not lead to their destruction. Moreover, the size and shape of the aggregates can be partially estimated by observing them with a scanning electron microscope. Finally, to date, there is no reliable way of quantifying the degree of aggregation. This is the reason for which the efficiency of step b) of the process according to the invention is measured in practice in an indirect way, by measuring the parameters of the particulate material provided by step b), as will be explained thereafter.

Practically, the shaking of step b) is generally carried out over at least a given minimum duration so as to form a particulate material having a substantially constant sinterability, the compressibility and sinterability of the particulate material having moreover substantially given values, independent from the amount of agglomerates and/or aggregates contained in each of the powders. The following consecutive steps must then be carried out in order to measure the sinterability and the compressibility of the particulate material obtained by the process according to the invention:

The particulate material is introduced into a mould;

Then a shaping stress is applied to the particulate material, generally from 200 to 1200 MPa, preferably from 200 to 1000 MPa, more preferably from 200 to 600 MPa, and even more preferably from 300 to 500 MPa, in order to obtain a compacted material;

Lastly, the sintering of the compacted material is carried out so as to obtain the dense material.

According to the invention, by "dense material" it is generally meant a material obtained through a densification operation such as sintering. By "compacted material" is generally meant a material obtained through a compaction operation.

The minimum given duration is thus generally the duration which, as the Applicant has surprisingly observed for a given grinding intensity, is necessary to obtain the advantageous properties of the particulate material according to the invention. It is directly correlated to a given minimum grinding energy. The sinterability "is given" in the sense that, for a powder of a given specific surface area, it has a determined or specific value, which is observed experimentally. Beyond this given duration, the sinterability of the particulate material is substantially constant, and the compressibility continues to increase. The compressibility is "given" in the sense that, for a powder of a given specific surface area, it has a determined or specific value or a similar or close value, which is in general observed experimentally. The grinding energy, i.e. in practice the grinding duration for a given grinding intensity, generally reaches a maximum value beyond which compressibility has a given constant value and the density of the compacted material does not change any more. This maximum value is generally associated with the maximum compactness ratio of the density of the compacted material to the theoretical density of the considered compound, which is 0.72 if the crystallites are considered, as a first approximation, to be spheres.

The given value of compressibility and the given value of sinterability depend on parameters that are specific to the characteristics of crystallites (size, shape, size distribution) and thus, indirectly, to the specific surface area of the powders, but in a surprising and advantageous way, do not depend on the quantity of aggregates and/or agglomerates in the powder.

The relative amounts of powders used in step a) are variable. For example, in the case of two powders and when one powder pollutes, as will be explained further, the other powder, the "pollutant" powder is generally present with a ratio of 0.1 to 1% by weight, relative to the total weight of these two powders. More generally, in the case of a first powder resulting from a <<dry route>> process and a second powder resulting from a <<wet route>> process, the first powder is in a ratio ranging from 10 to 50% by weight relative to the total weight of the two powders.

According to the invention, the powders, each of which comprises uranium dioxide $UO_2$, may have been introduced into the grinder simultaneously, for example as a mixture, or consecutively, by introducing at least one powder during step a) and then later introducing at least one other powder during step b).

One of the fundamental facts from which the invention derives is the surprising discovery of the properties of the particulate materials containing uranium dioxide $UO_2$ after the powders have been shaken by the vibrating grinder with at least a given minimum grinding energy, i.e. in practice, for at least a given minimum duration. More specifically, above a given minimum grinding energy, i.e., in practice, above a given minimum shaking period under a given grinding intensity, two surprising properties of the particulate material obtained were found: i) the sinterability of this particulate material levels off, whatever the duration of the shaking (and thus, whatever the grinding energy) to which it was subjected, and ii) the value of this sinterability is "universal", in the sense that it is in agreement with a value common to particulate materials derived from any one of the powders which, although having similar specific surface areas, did however have some different or even strongly dissimilar physical characteristics, for instance the agglomeration and aggregation degrees of the crystallites in these powders. Thus, in particular, the process according to this invention makes it possible to reduce the differences in sinterability between at least two uranium dioxide $UO_2$ powders, which, in spite of their similar specific surface areas, have disparate degrees of crystallite agglomeration and aggregation. This unexpected behaviour of the particulate materials obtained from the powders subjected to the process of the invention and the way it is obtained were never disclosed before. These behaviours are illustrated in FIGS. 4 and 5 explained hereinbelow. This behaviour of the powders has several significant industrial advantages.

Specifically, during the manufacture of nuclear fuel, whether in the form of pellets or tablets or other shapes, a powder, before a compaction step, is subjected to various manipulations, thereby implying transfers between two consecutive operations. The powder transfer and/or preparation equipment, which generally comprises containers or pneumatic means or conveyor belts, may then retain a more or less significant amount of powder. However, the nuclear fuel manufacturer often resorts to several providers or types of powder (for example, a powder obtained through a "dry route" process and a powder obtained through a "wet route process"). Thus, the powders used, although they are chemically identical, nevertheless originate from different sources. These different sources most often result in a wide variability of the aggregation and agglomeration state of the crystallites constituting such powders, and therefore, in widely variable compressibility and sinterability properties of said powders.

In order for the dense material that can be obtained from the particulate material obtained with the process according to the invention to have nevertheless constant characteristics in terms of dimensions and density, it is generally necessary: i) either to adapt the operating conditions of the powder manufacturing process for each powder, which may prove to be complex and expensive, since it may be difficult to simultaneously estimate not only the degree of pollution of one powder by another powder, but also the changes in the physical parameters of a mixture of at least two powders thus obtained; ii) or to avoid any mixing between two powders that are to be used consecutively, which implies the requirement to rinse the equipment that may cause retention.

By cancelling the differences in agglomeration and aggregation between at least two powders using the process according to the invention, these two powders being for example in a mixture resulting from the pollution of a first powder by a second powder, it is therefore possible to use, indifferently but in the same installation, several powders of comparable nature without having to worry about unintentional mixture of a new powder to an old powder, which might have been made by a different process and/or which would have remained in the installation due to retention. This obviously leads to a significant increase in productivity.

Thus the present invention is particularly beneficial for the manufacture of nuclear fuels, in the form of pellets or tablets or other shapes, under flexible, reproducible and independent operating conditions. These numerous advantages open the way to standardization when it comes to the industrial implementation of the process for sintering nuclear fuel powders.

As for the vibrating grinder and the movable bodies that it contains and are used in the process according the invention, these are of the same kind as, or even identical to those employed in patent application FR 2,861,888. Such a vibrating grinder, according to the present invention, is generally a device comprising a vessel including the compression and mixture means, which are movable bodies, wherein shaking the vessel is carried out in such a way that the powder it contains moves within the vessel's volume along three non-coplanar axes, so that the powder is compressed between the movable bodies themselves, and between the movable bodies and the walls of the vessel until forming a particulate material of increased density as compared to the powder. It should be noted that one skilled in the art may use a wide range of grinding intensities and grinding energies that may be provided by the vibrating grinder. In all cases, the vibrating grinder must permit the breaking up of the agglomerates and aggregates rather than the grinding of crystallites. The grinding energy generated by the vibrating grinder used according to the present invention can be modified, in particular, by changing the unbalance masses and the angular distance between the upper and lower unbalances, increasing the mass of the media, or changing their shape or their nature, or modifying the amount of powder.

According to a preferred aspect of this invention, at least one powder is obtained by a synthesis process of the "wet route" type, and at least one other powder is obtained by a synthesis process of the "dry route" type.

According to one embodiment of the invention, at least one of the powders contains at least one oxide chosen from the group consisting of uranium oxide $U_3O_8$, uranium oxide $U_3O_7$, plutonium oxide $PuO_2$ and thorium oxide $ThO_2$.

This oxide may also be added to the powders before and/or while performing the manufacturing process of the invention (steps a) to c)). For example, it is possible within the framework of the invention, to directly add such an oxide as a powder in the grinder.

When the powders contain plutonium dioxide $PuO_2$, a fuel of the MOX ("Mixed Oxide") type can then be advantageously made.

According to a preferred aspect of the present invention, at least one of the powders contains at least one additive selected from among gadolinium oxide $Gd_2O_3$, erbium oxide $Er_2O_3$, a pore-forming substance, such as, for example, ammonium oxalate or azodicarbonamide, a lubricant, such as zinc stearate or calcium stearate, and a sintering promoter, such as chromium oxide. More generally, this additive is most often comprised of at least one neutron absorbing or moderating substance for the control of nuclear reactors or at least one substance used in the manufacturing process (such as the lubricant), or for controlling the density (such as the pore-forming substance) and microstructure (such as the sintering promoter used in the sintering of the nuclear fuel, which, for example, is formed into a pellet).

This additive can be added to the powders before and/or while performing the manufacturing process of the invention (steps a) to c)).

According to a preferred aspect of the present invention, the shaking operation of the grinder is continued in order to increase the compressibility of the particulate material up to a given value, while sinterability remains substantially constant.

This is because, as will be illustrated in the following examples, one of the distinctive features of the process of the present invention is that, even if the sinterability of the particulate material has reached, at a given minimum grinding energy, i.e., in practice, at the end of a given minimum shaking period, an optimum value which may no longer vary, it is nevertheless still possible, when needed, to adjust its compressibility by continuing to shake this material in step b) of the process of the present invention. Thus, in an embodiment of the present invention, the shaking of step b) is carried out by the grinder so as to increase the compressibility of the particulate material up to a given, substantially constant value, while sinterability remains substantially constant.

It is yet another goal of the present invention to provide a product obtained by the process according to the present invention.

In all figures, each plotted point is generally an average of at least six exactly identical samples.

Figure 1:
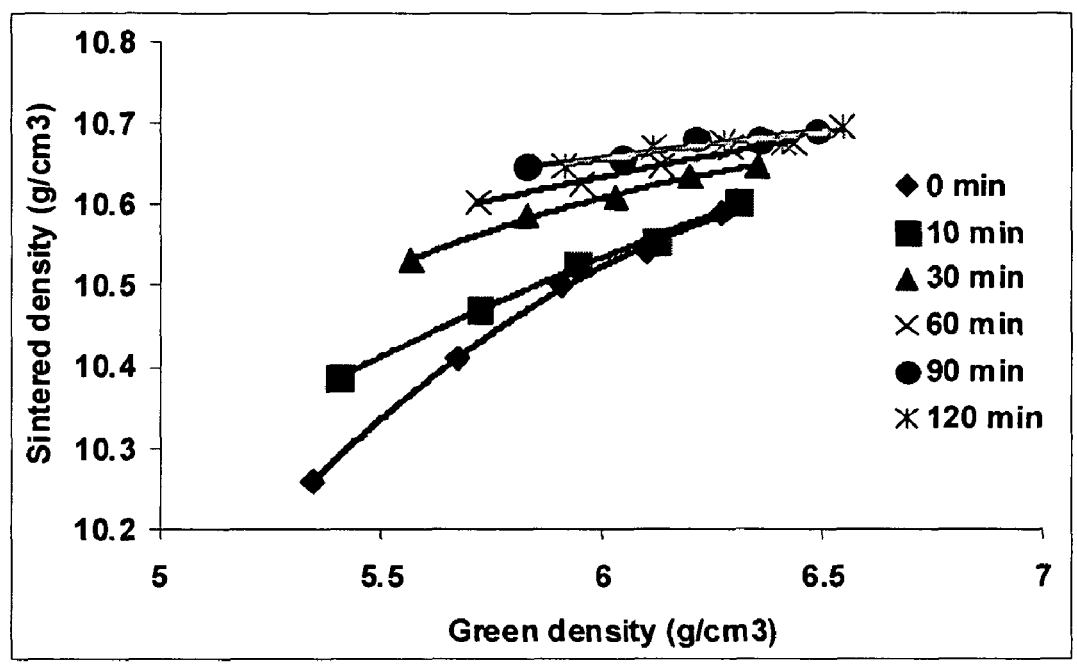
FIGS. 1 to 11 of the accompanying drawings will serve to explain the following examples 1 to 3.

FIG. 1 illustrates, for various shaking durations according to step b) of the process of the present invention, the change in sinterability of a compacted material (green compact) containing the particulate material obtained according to the present invention from a powder of uranium dioxide $UO_2$. This figure will allow one skilled in the art to determine the minimum given duration (for a given grinding intensity), beyond which the particulate material of the present invention forms on uranium dioxide $UO_2$ powders of similar nature, that is, although these powders have specific surface areas similar to one another, their crystallites have dissimilar degrees of agglomeration and aggregation.

Figure 2:
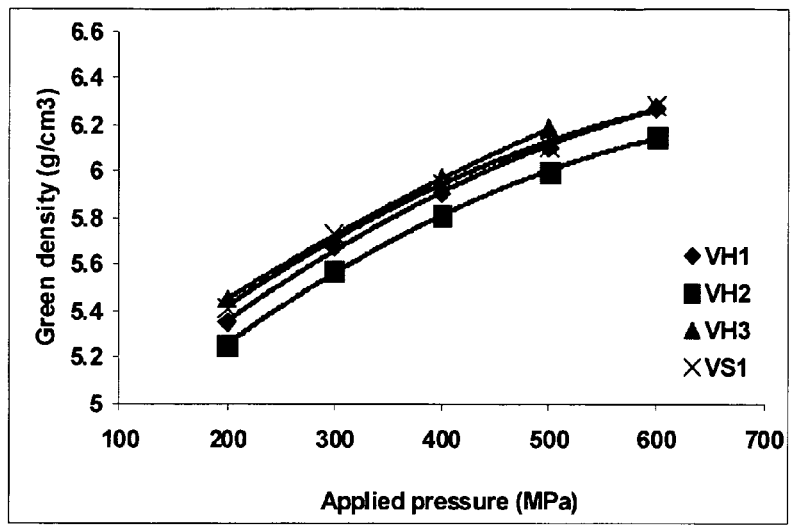
Figure 3:
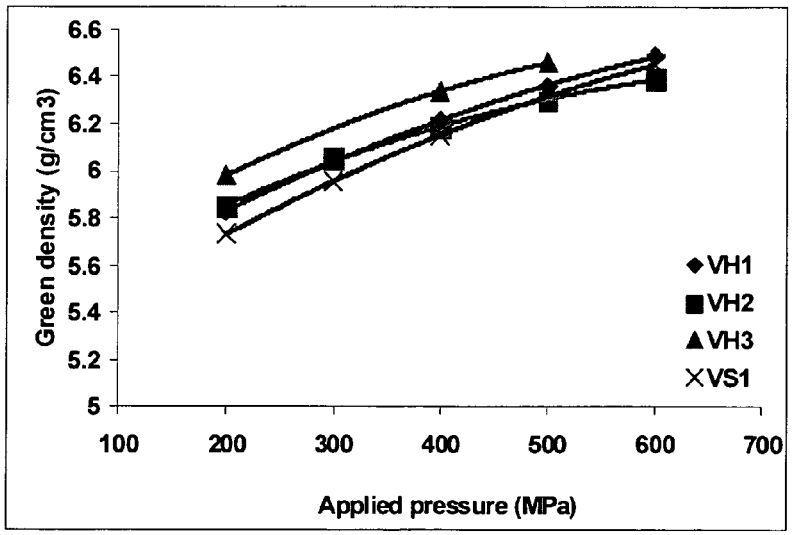

FIGS. 2 and 3 illustrate the compressibility (change in density of a compacted material (green compact) as a function of the various shaping stress values applied to make this compacted material), respectively, for different powders and for the particulate materials obtained from each of these powders according to the present invention.

Figure 4:
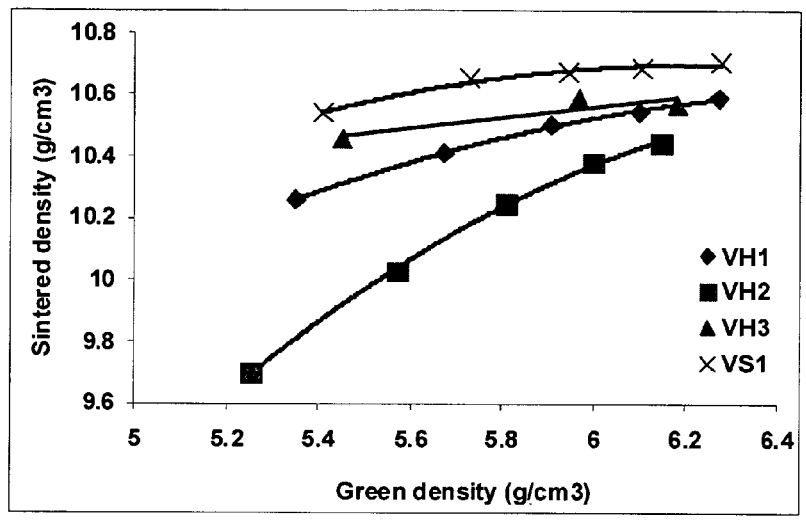
Figure 5:
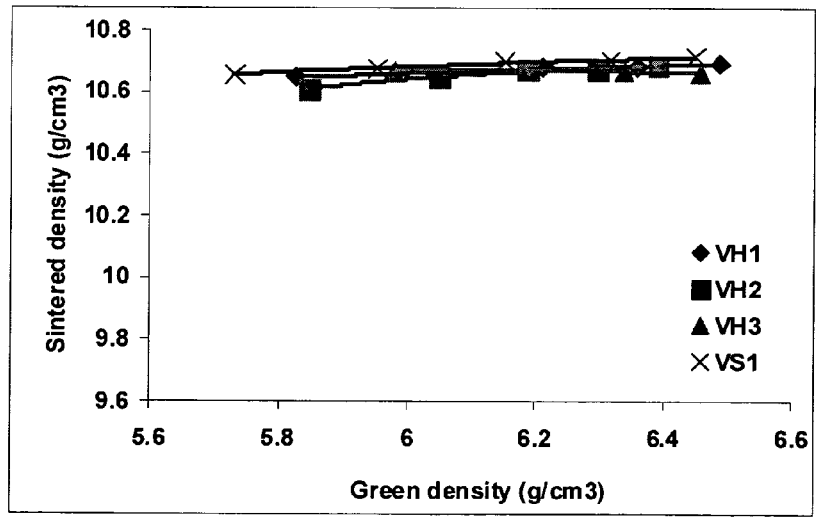

FIGS. 4 and 5 illustrate the sinterability (change in density of a dense material (sintered body) as a function of the density of the corresponding compacted material (green compact) respectively, for different powders and for the different particulate materials obtained from the same powders according to the present invention.

Figure 6:
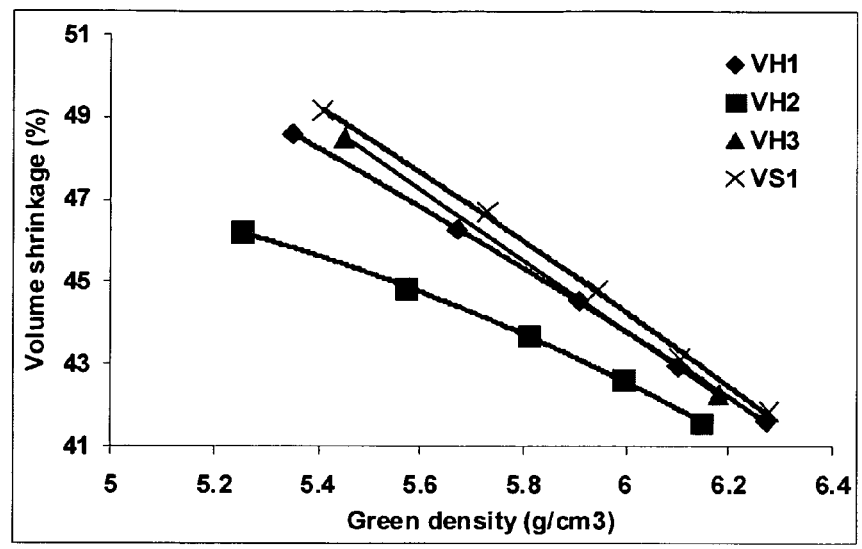
Figure 7:
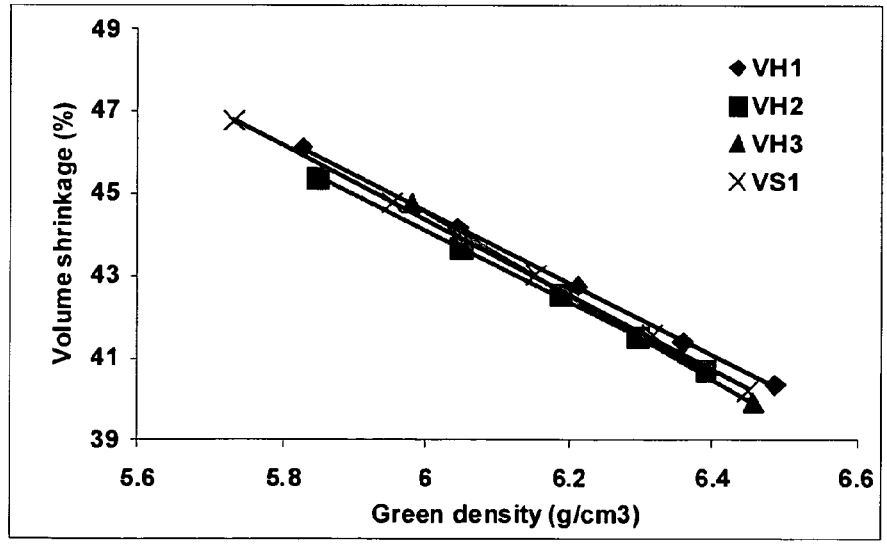

FIGS. 6 and 7 illustrate the change in volume shrinkage of the dense materials (sintered bodies) as a function of the density of the corresponding green compacts containing, respectively, at least one of the powders and one of the particulate materials obtained according to the present invention from the same powders.

Figure 8:
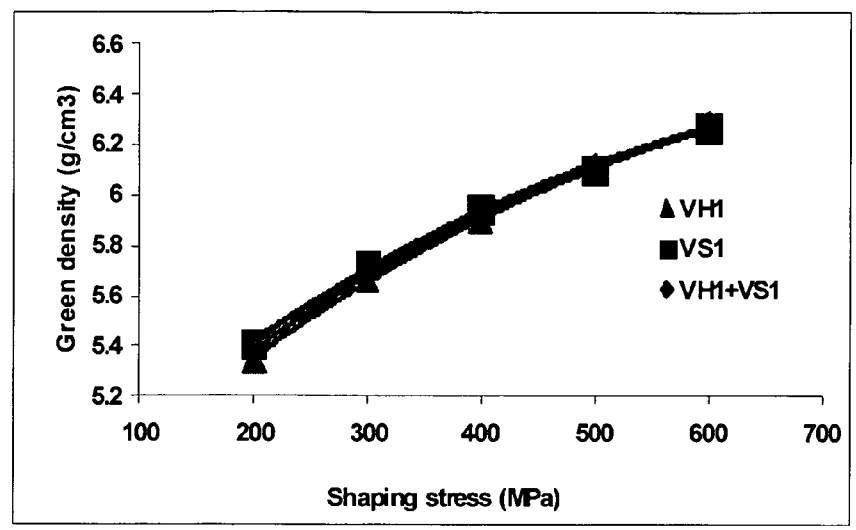
Figure 9:
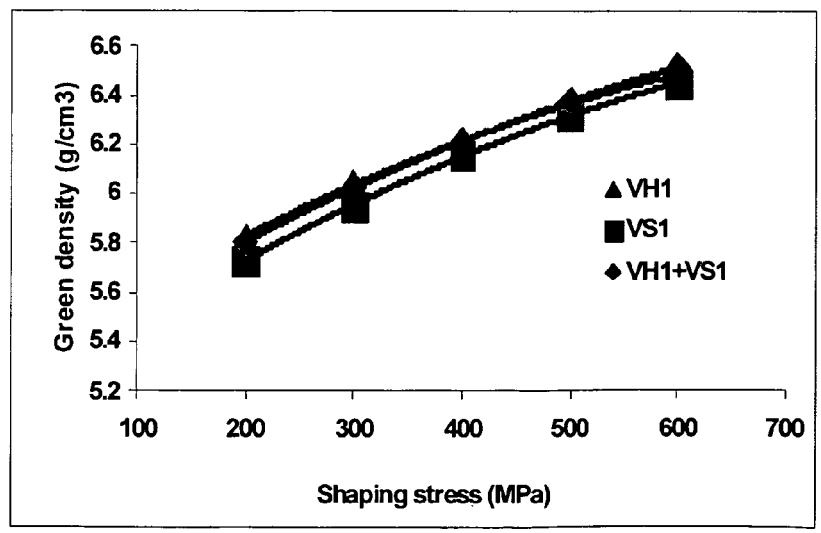

FIGS. 8 and 9 illustrate i) compressibility for two powders and for its mixture and ii) compressibility for the particulate materials obtained from each of these two powders and from this mixture, respectively, according to the present invention.

Figure 10:
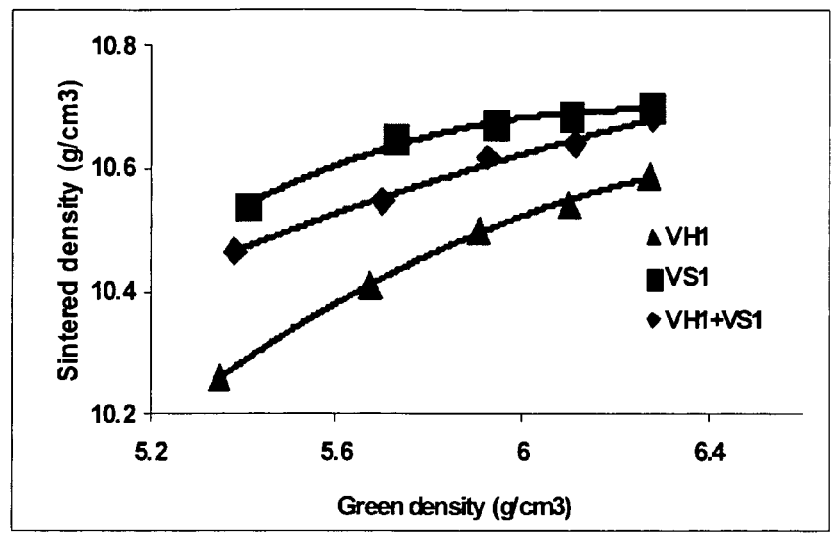
Figure 11:
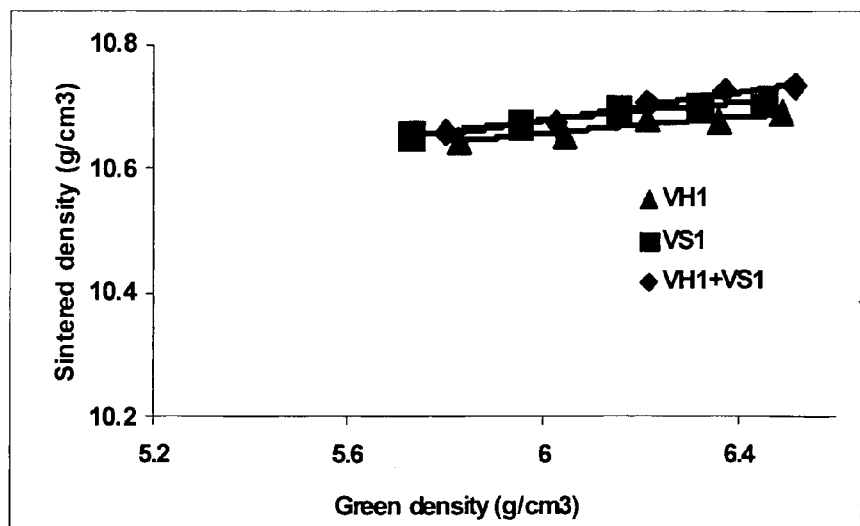

FIGS. 10 and 11 illustrate i) sinterability for two powders and for its mixture, and ii) sinterability for the particulate materials obtained from each of these two powders and from this mixture, respectively, according to the present invention.

The following illustrative examples are not intended to limit the scope of the invention in any way.

DETAILED DESCRIPTION

The invention will be better understood from the following examples, which illustrate the process for manufacturing a dense material using the process for manufacturing a particulate material.

The examples which follow are in all respects in accordance with the process of the present invention, in particular when they are carried out using only one powder at a time, rather than at least two, since it will be clear to one skilled in the art that each of these powders exhibits the compressibility and sinterability properties obtained according to the present invention, even in the presence of at least one other powder, as is the case in the process of the present invention wherein at least two powders are considered. This is also demonstrated in other examples relating to a mixture of two powders obtained by two different synthesis processes.

In all of the following embodiments, the preparation, shaping and sintering operations were carried out under the same operating conditions for all powders (or mixtures of powders), and for all particulate materials (or mixtures of particulate materials) obtained from the powders according to the present invention.

These examples were carried out on each of the uranium dioxide $UO_2$ powders (or powder mixture) that were synthesized by means of a "wet route" process (powders VH1, VH2 and VH3) (each of these powders being synthesized by a so-called ADU process (Ammonium Di Uranate of formula $U_2O_7(NH_4)_2$) as explained, for example, in U.S. Pat. No. 6,235,223, but each powder originating from three different installations, each with different manufacturing parameters, thus explaining their different characteristics), and a "dry route" process (powder VS1). Powders VH1, VH2, VH3, and VS1 have similar specific surface areas, of 3.8 m$^2$/g; 3.0 m$^2$/g; 3.3 m$^2$/g and 2.1 m$^2$/g, respectively. The particulate materials obtained according to the present invention from powders VH1, VH2, VH3, and VS1 have specific surface areas of 4.2 m$^2$/g; 3.7 m$^2$/g; 4.2 m$^2$/g and 2.6 m$^2$/g, respectively. The slight increase in the observed specific surface area, from the powder state to the state of particulate materials derived from the powders, is generally due to the appearance of surfaces resulting from the breaking up of the aggregates and agglomerates. This is also the case when going from the powder mixture state to the state of a mixture of particulate materials obtained from this powder mixture. In all examples, each point plotted in the figures is generally an average of at least six exactly identical samples.

The vibrating grinder used was an apparatus marketed under the trade name Vibromill by SWECO. It comprised a polyurethane vessel resting on springs and supporting an unbalanced motor. The vessel had a toroidal shape with a semicircular cross-section.

The motion of the vessel induced a displacement of the movable grinding bodies (media), which underwent a triple motion. They "went up" against the external wall of the vessel and fell down, moved along the torus generator line, and rotated about themselves. The fall distance of the media was a function of the unbalance, and the rate of travel of the media along the torus generator line was a function of the angular distance between the upper unbalance and the lower unbalance.

The conditions used in these examples were generally those recommended by SWECO. Thus, the parameters for adjusting the vibration intensity were the mass of the lower unbalance and the angular distance between the two unbalances. The lower unbalance consisted of five plates with a total mass of 575 g. The angular distance between the lower unbalance and the upper unbalance was 60°. The mass of the media used was 36 kg; the mass of powder (or mixture of powders) grinded in the examples was 4 kg. A metal cover closed the vessel. An opening in this cover allowed the powder(s) to be introduced. The junction between the vessel and the cover was sealed by O-rings.

Before being shaped (compaction operation), the powders were prepared as follows: the powders were lubricated by adding 0.3% by weight of zinc stearate over 10 minutes at 20 rpm using a gently-acting mixer (Turbula trademark). The thus obtained mixture was then introduced into a cylindrical mould. The diameter of the mould was 10 mm and its height was set to 30 mm. Filling of the mould was carried out manually and the excess mixture was then scraped off. This mixture was then compacted and shaped by applying a stress appropriate for shaping, that is, a stress that may range preferably from 200 to 600 MPa. As will be seen thereafter, one of the advantages of the process according to the present invention, which makes it particularly reliable and reproducible, is precisely the fact that it smoothes out the differences in sinterability of powders compacted under varying shaping stresses. Consequently, the value of the shaping stress, as long as it remained in the above-mentioned range, had substantially no influence on the sinterability of the tested powders to obtain a dense material according to the present invention.

The green compact obtained at the end of the preceding compaction step was then subjected to a sintering step in which the green compact was heated from ambient temperature to 1000° C. at a rate of 350° C./h, and this temperature of 1000° C. was then maintained for one hour. This temperature of 1000° C. was then increased at a rate of 350° C./h to 1700° C., which temperature was maintained for 4 hours. Lastly, cooling was carried out at a rate of 300° C./h. The sintering atmosphere was dry hydrogen. A slightly oxidizing or reducing humidified atmosphere could also have been appropriate, as long as the atmosphere at the end of the treatment makes it possible to obtain a stoichiometric phase of $UO_2$.

Example 1

Determination of the Given Minimum Duration (Corresponding to a Minimum Given Grinding Energy) During which Shaking Must be Performed so as to Form the Particulate Material According to the Invention In order to determine, according to the present invention, the minimum given duration (corresponding to a minimum given grinding energy) during or beyond which the shaking must be performed so as to form the particulate material, a preliminary investigation was carried out, which consisted in grinding a uranium dioxide $UO_2$ powder during a variable time interval. For each grinding duration, a powder sample was taken, and then when it was shaped (compaction operation), the density of the green compact was calculated based on the measured weights and dimensions of the green compacts. Then, a sintering operation was performed, following which a sintered body was obtained, whose density was measured under the same conditions. After these operations were finished, the change in density of the green compact as a function of the sintered body density was plotted, for each grinding duration, in a figure such as the one plotted for powder VH2, and shown by way of example in FIG. 1. The minimum given duration according to the present invention was then simply determined as the grinding duration beyond which the sinterability of the powder became substantially constant. For powder VH2, this duration was estimated to be 90 minutes, no significant change in sinterability being noted for a 120 minute duration, as illustrated in FIG. 1. Of course, one skilled in the art will be able to carry out a measurement of the minimum given duration (corresponding to a minimum given grinding energy), for a given grinding intensity and a given powder.

Example 2

Characterization of the Compressibility Property of the Particulate Materials Obtained for Powders VH1, VH2, VH3 and VS1 According to the Present Invention Powders VH1, VH2, VH3 and VS1, and the particulate materials obtained according to the present invention from these powders then underwent the preparation and shaping operations under the above-mentioned operating conditions in order to form green compacts, and the density of each of them was measured according to the preceding procedure. The change in density of these eight green compacts as a function of the applied shaping stress is plotted in FIGS. 2 and 3.

The overall operations described in the preceding paragraph were again performed for a mixture of powders comprising 50% of VH1+50% of VS1, by weight, as well as for the particulate material obtained according to the present invention from this mixture. The mixture had a specific surface area of 2.64 m$^2$/g and the particulate material, a specific surface area of 3.21 m$^2$/g.

It was noted (see FIG. 2) that the density of the green compact containing the powders increased with the shaping stress. Its values for powders VH1, VH3 and VS1 were substantially similar, only powder VH2 having a slightly smaller value than the others. A similar observation was made for the mixture of powders VH1+VS1 (see FIG. 8).

As regards the particulate materials, which were all produced in step b) for which the minimum given duration was 90 minutes, an increase in compressibility for all of these materials was noticed from FIG. 3. This increase was approximately 4% for smaller stresses (200 MPa) and 2% for larger stresses (600 MPa). A similar observation was made for the mixture of powders VH1+VS1 (see FIG. 9).

It may thus be noted that, for a given shaping stress and a given shaking duration, which here is equal to the minimum given duration, the compressibility of these various materials is substantially constant after the process of the present invention has been applied, and that, for all powders (or powder mixtures) the increase in density as a function of the applied stress is smaller. This reduced dependence of the density of the green compacts on the applied stress advantageously makes it possible to reduce the previously mentioned deviation from cylindricality, when the nuclear fuel is shaped into a substantially cylindrical pellet.

Example 3

Characterization of the Sinterability of the Particulate Materials Obtained from Powders VH1, VH2, VH3 and VS1 According to the Present Invention The fourteen green compacts (of which two contained a mixture of powders VH1+VS1) obtained in example 2 were subjected to a sintering operation under the above-mentioned operating conditions in order to form sintered bodies. The density of each green compact and the density of each sintered body were measured according to the above procedure.

Sinterability was plotted in FIGS. 4 and 5 for the above-mentioned compacts containing only one powder and in FIGS. 10 and 11 for the above-mentioned compacts containing a mixture of powders.

It was noticed from FIG. 4 that the powders, to which step b) of the process of the present invention was not applied, had widely different sinterabilities, whereas their compressibilities were close to one another. A similar observation was made for the mixture of powders VH1+VS1 (see FIG. 10).

Conversely, it was observed in FIG. 5 that the 90 minute application of step b) of the process of the present invention led to a substantially constant and substantially identical sinterability, whatever the particulate material considered. A similar observation was made for the mixture of powders VH1+VS1 (see FIG. 11).

Also, whatever the density of the green compact formed from the same particulate material, the density of the corresponding sintered bodies lay in the range from 10.61 to 10.71 g/cm$^3$, which represented a density variation of less than 1%. This deviation is smaller than the density tolerance generally specified for the manufacture of nuclear fuel materials in the form of pellets or tablets or other shapes. Moreover, if the applied stress is restricted to the range from 300 to 500 MPa, which is the stress range generally used in the industry, the sintered densities all range from 10.66 to 10.70 g/cm$^3$.

It may thus be seen from these various examples, in particular from FIGS. 3 and 5 as well as FIGS. 9 and 11, that one of the distinctive features of the process of the present invention is that, even if the sinterability of the particulate material reaches, at the end of a given minimum shaking duration, an optimum value which thereafter remains substantially constant, it is nevertheless still possible, if needed, to adjust the compressibility of this material by continuing its shaking.

Therefore, it is possible to adjust the compressibility of the powders (or mixture of powders) without modifying the density of the sintered body, which is generally a value specified by design. Thus, if another powder (or mixture of powders) is used in the process of manufacturing a fuel material, in order to keep the density of the sintered body constant, either i) the grinding duration is adapted and the shaping stress is not changed so as to obtain the same density of the green compact, or ii) the grinding duration is kept constant (larger than or equal to the minimum given duration of the present invention) and the shaping stress is adapted so as to obtain a constant green density (see FIG. 3). The flexibility and reliability of the process are thus remarkable.

This very weak dependence of the density of the sintered bodies on the density of the green compacts advantageously makes it possible to control the dimensional properties without modifying the density of the sintered bodies. In addition, since shrinkage is generally a function only of the density of the considered powder (or mixture of powders) in the green state, it is sufficient to anticipate the sintering-induced shrinkage by accounting for it in the design size of the green compact, for example, by arranging to obtain a green compact which, compared to the sintered body, has dimensions which are greater by a value corresponding to said shrinkage. Thus, after sintering, whatever the origin of the powder (or origins of the powders constituting the mixture of powders), according to the present invention, an object having the desired size or a size as close as possible to the desired size (thus reducing re-grinding needs) is obtained by modifying only slightly, and within the specified interval, the density of the sintered bodies. The consistency, for a given density of the green compact, of the shrinkage value for different powders when they are shaken according to the process of the present invention, is illustrated in FIGS. 6 and 7.

This is a significant advantage, in particular in terms of productivity and safety, when the invention is implemented for the manufacture of nuclear fuels in the form of pellets or tablets or other shapes, in an industrial setting.

The invention claimed is:
1. A process for the manufacture of at least one particulate material, the process comprising:
introducing at least two powders each including uranium dioxide $UO_2$ into a vibrating grinder, at least two powders provided by two different synthesis routes; and
shaking the powders with the vibrating grinder so as to form a particulate material lacking agglomerates and aggregates, the shaking including breaking up the agglomerates and the aggregates in the powders without at the same time breaking up the crystallites in the pow- ders, the shaking destroying substantially all of the agglomerates and aggregates in the powders.

2. The process according to claim 1, wherein at least one powder is obtained by a synthesis process of the "wet route" type, and at least one other powder is obtained by a synthesis process of the "dry route" type.

3. The process according to claim 2, wherein at least one of the powders contains at least one oxide chosen from the group consisting of uranium oxide $U_3O_8$, uranium oxide $U_3O_7$, plutonium oxide $PuO_2$, and thorium oxide $ThO_2$.

4. The process according to claim 2, wherein at least one of the powders contains at least one additive chosen from the group consisting of gadolinium oxide $Gd_2O_3$, erbium oxide $Er_2O_3$, a pore forming substance, a lubricant, and a sintering promoter.

5. The process according to claim 2, wherein the shaking is carried out over at least a duration so as to form a particulate material having a substantially constant sinterability, compressibility and sinterability of the particulate material having values independent from the amount of agglomerates and/or aggregates contained in each of the powders.

6. The process according to claim 2, wherein the shaking is carried out by the grinder so as to increase the compressibility of the particulate material up to a substantially constant value, while sinterability remains substantially constant.

7. The process according to claim 2, wherein each powder has a specific surface area within about 10 $m^2/g$ of each other powder.

8. The process according to claim 1, wherein at least one of the powders contains at least one oxide chosen from the group consisting of uranium oxide $U_3O_8$, uranium oxide $U_3O_7$, plutonium oxide $PuO_2$, and thorium oxide $ThO_2$.

9. The process according to claim 8, wherein at least one of the powders contains at least one additive chosen from the group consisting of gadolinium oxide $Gd_2O_3$, erbium oxide $Er_2O_3$, a pore forming substance, a lubricant, and a sintering promoter.

10. The process according to claim 8, wherein the shaking is carried out over at least a duration so as to form a particulate material having a substantially constant sinterability, compressibility and sinterability of the particulate material having values independent from the amount of agglomerates and/or aggregates contained in each of the powders.

11. The process according to claim 8, wherein the shaking is carried out by the grinder so as to increase the compressibility of the particulate material up to a substantially constant value, while sinterability remains substantially constant.

12. The process according to claim 8, wherein each powder has a specific surface area within about 10 $m^2/g$ of each other powder.

13. The process according to claim 1, wherein at least one of the powders contains at least one additive chosen from the group consisting of gadolinium oxide $Gd_2O_3$, erbium oxide $Er_2O_3$, a pore forming substance, a lubricant, and a sintering promoter.

14. The process according to claim 13, wherein the shaking is carried out over at least a duration so as to form a particulate material having a substantially constant sinterability, compressibility and sinterability of the particulate material having values independent from the amount of agglomerates and/or aggregates contained in each of the powders.

15. The process according to claim 13, wherein the shaking is carried out by the grinder so as to increase the compressibility of the particulate material up to a substantially constant value, while sinterability remains substantially constant.

16. The process according to claim 13, wherein each powder has a specific surface area within about 10 $m^2/g$ of each other powder.

17. The process according to claim 1, wherein the shaking is carried out over at least a duration so as to form a particulate material having a substantially constant sinterability, compressibility and sinterability of the particulate material having values independent from the amount of agglomerates and/or aggregates contained in each of the powders.

18. The process according to claim 17, wherein each powder has a specific surface area within about 10 $m^2/g$ of each other powder.

19. The process according to claim 1, wherein the shaking is carried out by the grinder so as to increase the compressibility of the particulate material up to a substantially constant value, while sinterability remains substantially constant.

20. The process according to claim 19, wherein each powder has a specific surface area within about 10 $m^2/g$ of each other powder.

21. The process according to claim 1, wherein each powder has a specific surface area within about 10 $m^2/g$ of each other powder.

* * * * *